US012755619B2

(12) United States Patent
Harman

(10) Patent No.: US 12,755,619 B2
(45) Date of Patent: Oct. 6, 2026

(54) INTRUSION DETECTORS, AND RELATED SYSTEMS AND METHODS

(71) Applicant: Fiber Sensys Inc., Almonte (CA)

(72) Inventor: Keith R. Harman, Almonte (CA)

(73) Assignee: Fiber Sensys Inc., Almonte (CA)

( * ) Notice: Subject to any disclaimer, the term of this patent is extended or adjusted under 35 U.S.C. 154(b) by 48 days.

(21) Appl. No.: 18/997,389

(22) PCT Filed: Aug. 2, 2022

(86) PCT No.: PCT/CA2022/051174
§ 371 (c)(1),
(2) Date: Jan. 21, 2025

(87) PCT Pub. No.: WO2024/026552
PCT Pub. Date: Feb. 8, 2024

(65) Prior Publication Data
US 2026/0024424 A1 Jan. 22, 2026

(51) Int. Cl.
*G08B 13/26* (2006.01)
*G08B 13/12* (2006.01)

(52) U.S. Cl.
CPC .................................. *G08B 13/122* (2013.01)

(58) Field of Classification Search
None
See application file for complete search history.

(56) References Cited

U.S. PATENT DOCUMENTS 5,448,222 A * 9/1995 Harman ............... G08B 13/169 340/566
7,479,878 B2 * 1/2009 Maki ................. H01B 13/0165 340/552

(Continued)

FOREIGN PATENT DOCUMENTS

CA 2780396 A1 12/2013

*Primary Examiner* — John F Mortell
(74) *Attorney, Agent, or Firm* — Grogan, Tuccillo & Vanderleeden LLP

(57) ABSTRACT

In at least one embodiment, a fence disturbance sensor is disclosed wherein a sensor cable having a signal processor on each end of the cable correlates the response data as seen from both ends of the cable to detect and locate intruders attempting to breach the fence. The processors at each end of the cable time multiplex the transmission of a phase coherent coded pulse sequence along the coaxial line creating both co-directional and contra-directional signals to propagate along the shielded moving-wire transmission line. When the cable is disturbed, the impedance of the shielded moving-wire transmission line, causing a change in the coupled signals which are used to detect and locate the disturbance. Hence when the cable is disturbed time multiplexed contra-directionally coupled responses are detected in complementary range bins where the amplitude and phase of the two responses are correlated by taking the complex product of the complementary range bin responses, thereby detecting the audio signal creating a magnitude and phase response in the array of complementary range bins. Hence to create an Event, a disturbance must be detected at the same time at the same location and with the same audio. When a prescribed number of Events occur at the same location within a prescribed time window an Alarm is declared.

20 Claims, 5 Drawing Sheets

(56) References Cited

U.S. PATENT DOCUMENTS

| | | | | |
|---|---|---|---|---|
| 8,483,262 | B2 * | 7/2013 | Mainini | G08B 13/1654 375/228 |
| 10,902,710 | B2 * | 1/2021 | Harman | G08B 13/2491 |
| 2008/0036597 | A1 | 2/2008 | Harman | |
| 2017/0039826 | A1 | 2/2017 | Cojocaur | |
| 2019/0164400 | A1 | 5/2019 | Harman | |

* cited by examiner

INTRUSION DETECTORS, AND RELATED SYSTEMS AND METHODS

CROSS-REFERENCE TO RELATED APPLICATIONS

This application is a national stage of International Application No. PCT/CA2022/051174 filed on Aug. 2, 2022. This application pertains to concepts disclosed in U.S. Pat. No. 5,446,446, issued Aug. 29, 1995; U.S. Pat. No. 5,448,222, issued Sep. 5, 1995; U.S. Pat. No. 7,479,878 issued Jan. 20, 2009, and U.S. Pat. No. 10,902,710, issued Jan. 26, 2021. The disclosure of each of the foregoing patents is hereby incorporated by reference in its entirety as if fully set forth herein, for all purposes.

FIELD

This application and the subject matter disclosed herein (collectively referred to as the "disclosure"), generally relates to systems and methods for detecting intruders past an enclosed outdoor perimeter, and related systems and methods. More particularly, but not exclusively, this disclosure relates to a Coupled Line Reflectometer (CLR) sensor line where a disturbance occurs along an enclosed perimeter.

BACKGROUND

Several types of known sensor cables are designed to attach to a perimeter fence to detect a person attempting to cut through the fence or climb over the fence. Such cables are based on various established technologies including, by way of example, electret, triboelectric, piezoelectric, moving wire in a magnetic core and various types of fiber optic cables. These sensors are widely used in outdoor perimeter security around the world.

More recently, cable sensors that detect and locate a person attempting to cut through the fence or climb over the fence are being used around the world. The ability to pinpoint the location of the intruder on the perimeter has improved the assessment of alarms using CCTV cameras and other video equipment. In addition to improved assessment, these ranging sensors tend to also provide a lower False Alarm Rate (FAR) and Nuisance Alarm Rate (NAR) while providing a high Probability of Detection (PD). The FAR and NAR and PD of a sensor largely determines the effectiveness of such perimeter security equipment.

There is a number of ranging cable sensor technologies including; fiber optic cables and copper-based cables using Time Domain Reflectometry (TDR) in one form or another. A number of sensor cables can be described as a "wire-in-tube," as suggested by Westinghouse in the 1974 Carnahan paper by F. Geil and H. Glicher. Sensors that use TDR to locate targets are described in U.S. Pat. Nos. 5,446,446, 5,448,222 and 7,479,878. Such technology is sometimes referred to in the art as Coupled Line Reflectometry (CLR). In U.S. Pat. No. 5,448,222, a coaxial core has sense wires floating in one or two slots on the periphery of the core. In basic terms, a pulse of RF energy is transmitted down the coaxial line and the coupled response is measured on the sense wire line. As in TDR, the time delay between the onset of the pulse and the receipt of the change in the coupled response, caused by motion of the cable, is used to detect and locate an intruder on the perimeter attempting to cut through a fence or to climb over a fence.

Existing sensors based on CLR and "wire in tube" technologies have a signal processor at one end of the cable and an RF termination on the other end of the cable. However, the length of such sensors is limited by RF attenuation in the cables. This attenuation is largely due to resistive losses in the conductors and dielectric losses in the cable dielectric. In general, the FAR and NAR of these sensors depends on the Signal to Noise Ratio (SNR). Since cable attenuation means that the signal strength decreases with distance from the processor, the SNR also decreases with distance from the processor. Accordingly, performance as measured by FAR and NAR increases with increasing the length of the cable.

Commonly assigned U.S. Pat. No. 10,902,710 describes another approach for detecting intruders. In the '710 patent, two leaky coaxial cables are buried next to each other around a perimeter. A pulse of RF is transmitted along one cable (TX) and the coupled response is retrieved from the other (RX) cable. When an intruder crosses over the buried cables, the coupling between the TX and RX cables changes. A time delay between the onset of a transmitted pulse and the change in the received signal caused by the intruder is used to detect and locate the intruder along the length of the cables. To create an Alarm the target responses as seen by the processors on both ends of the transmit and receive cables must be correlated. They must appear at the same time and at the same location in a process called End-To-End correlation

SUMMARY

Unlike prior CLR technologies where performance and sensitivity decreases with increasing cable length, disclosed technologies provide uniform detection sensitivity along the length of the sensor cable. Among other advantages, disclosed intrusion detectors and systems also permit an operator's attention to be directed to the location of an intrusion because they detect and location the position of the intrusion along the cable sensor.

In some respects, concepts disclosed herein generally concern intrusion detectors, and more particularly but not exclusively, to intrusion detectors that provide end-to-end correlation (E2EC) of disturbances detected and located by more than one processor. Such E2EC provided by a processor at each opposed end of a cable sensor can provide uniform detection sensitivity along the length of the cable, improving measures of FAR and NAR.

In at least one embodiment, a fence disturbance sensor is disclosed that can have a first processor and a second processor. It is contemplated that a cable can extend from the first processor to the second processor and have an internal, movable sensor element (e.g., an electrical conductor or other transmission line). Moreover, the first processor and the second processor can be configured to detect and to locate movement of the movable sensor element.

It is contemplated that one or both of the first processor and the second processor can also be configured to assess, in real time, a measure of correlation between the detected and located movement of the movable sensor element by the other of the first processor and the second processor. For example, the first processor can assess whether its detected and located movement of the movable sensor element correlates with the detected and located movement of the movable sensor element determined by the second processor. When both processors detect the same movement of the movable sensor element, at the same location, the fence disturbance sensor can conclude that a fence has been disturbed at a specific location along the length of the cable.

In some embodiments, the cable can include two conductors: a first conductor and a second conductor. The one of the first and the second conductor can be a moving-wire transmission line and the other of the first and second conductor can be a component of a coaxial cable, such that as a signal propagates down the first conductor, a corresponding signal couples onto the second conductor. In operation, the conductors can operate as transmission lines carrying the respective signals, as will be readily appreciated by the skilled person.

In some embodiments, the cable further comprises a dielectric core extending longitudinally along the cable, e.g., from the first processor to the second processor. The first conductor can extend longitudinally within the dielectric core, e.g., from the first processor to the second processor. Further, the dielectric core can define a longitudinally extending slot and the moving-wire transmission line can be movably positioned within the slot.

In at least one embodiment, the first processor and the second processor use time domain reflectometry from the first end and the second end, respectively, of the sensor cable to detect and locate motion of the movable sensor element.

It is contemplated that one or both of the first processor and the second processor can be configured to emit a coded pulse into the cable and use a matched filter on an observed response to detect and locate motion of the moving-wire transmission line. For example, it is contemplated that the coded pulse can combine an RF carrier and a transmitted chip, where a phase of the RF carrier is coherent with the transmitted chip. The first processor, for example, can use a phase of the observed response to locate movement of the moving-wire transmission line within a range bin. In some embodiments, the coded pulse is a Pseudo Noise sequence.

In some embodiments, it is contemplated that the coded pulse is a first coded pulse emitted by the first processor, the matched filter is a first matched filter, and the observed response is an observed response by the first processor (the "first observed response"). The second processor can be configured to emit a second coded pulse into the cable and use a second matched filter on a response observed by the second processor (the "second observed response") to detect and locate motion of the moving-wire transmission line. It is further contemplated that at least the first processor can be configured to communicate the presence and location of movement of the moving-wire transmission line to the second processor. The second processor, for example, can be configured to whether the presence and location of movement of the moving-wire transmission line determined by first processor correlates with the presence and location of movement of the moving-wire transmission line determined by the second processor. The second processor can declare an alarm if the presence and location of movement correlate with each other.

The first processor and the second processor can be configured to observe first and second modulated responses, respectively, from the cable. At least the first processor can be configured to determine whether the first and the second modulated responses are correlated with each other. The first processor can be further configured to declare an alarm responsive to determining the first and the second modulated responses are correlated with each other.

In at least one embodiment, it is contemplated that power for one or both processors can be distributed along the cable.

In some embodiments, it is contemplated that the first processor, the second processor, or another processor transmits or receives data communicated over the cable.

In other embodiments, processors for fence disturbance sensors are disclosed. Such a processor can include a signal transmitter configured to transmit a first signal over a first transmission line, e.g., a central conductor of a coaxial cable. More specifically, but not exclusively, the transmitter can emit the first signal over the first transmission line in time-multiplexed relation to another signal emitted over the first transmission line by another device (e.g., a second processor). The processor also can have a receiver configured to receive a signal over each of one or more (e.g., a pair of) transmission sense lines (e.g., a moving-wire transmission line positioned radially outward of a central conductor of a coaxial cable) of the cable sensor. The receiver can be further configured to observe a contra-directional signal on a transmission sense line that corresponds to the first signal carried on the central transmission line. The processor can also include circuitry configured to compare the contra-directional signal in relation to a plurality of time-delayed versions of the first signal. The circuitry can be configured to detect and to locate a disturbance along the cable sensor in correspondence with an observed delay between the time the first signal is emitted into the central transmission line and the time a change in the contra-directional signal is observed. The circuitry can also be configured to assess whether data carried by the other signal and the observed contra-directional signal correlate with each other, e.g., in real-time. When the signals correlate with each other, the circuitry can declare an event.

In another embodiment, fence-disturbance sensors are described wherein the fence-disturbance sensor can have a cable sensor that extends from a first end to a second end and has a central transmission line (e.g., an electrical conductor) and a movable transmission line (e.g., another conductor). A signal on the central transmission line can induce a corresponding signal on the movable transmission line. A first processor can couple with the first end of the cable sensor. The first processor can couple (e.g., electrically couple) with the central transmission line and be configured to emit a first signal over the central transmission line. The processor can emit the signal in time-multiplexed relation to another signal emitted over the central transmission line by another device (e.g., a second processor). The first processor can also have a receiver coupled (e.g., electrically) with the movable transmission line and configured to observe a contra-directional signal induce on and carried by the movable transmission line. The contra-directional signal can be induced by and correspond to the first signal on the central transmission line. The first processor can also have circuitry configured to compare the contra-directional signal in relation to a plurality of time-delayed versions of the first signal. More particularly, the circuitry can be configured to detect and to locate a disturbance along the cable sensor in correspondence with an observed delay between the time the first signal is emitted over the central transmission line and the time a change in the contra-directional signal is observed. Additionally, the circuitry can be configured to determine whether a presence and location of the disturbance determined by the first processor correlates with a presence and location determined by the other device.

In some embodiments the cable sensor has a longitudinally extending dielectric core defining a longitudinally extending channel. The central transmission line can be a central conductor arranged to extend longitudinally within the dielectric core, and the moving-wire transmission line can be a movable conductor element positioned within and extending along the longitudinally extending channel.

In an embodiment, the longitudinally extending channel is so sized relative to the moving-wire transmission line as to permit the moving-wire transmission line to move within the longitudinally extending channel in response to a predetermined threshold movement of the cable sensor. In an embodiment, the longitudinally extending channel is a first longitudinally extending channel and the longitudinally extending dielectric core can define a second longitudinally extending channel. The moving-wire transmission line can be a first moving-wire transmission line and the sensor cable can have a second moving-wire transmission line positioned in the second longitudinally extending channel.

As with the first longitudinally extending channel, the second longitudinally extending channel can be so sized relative to the second moving-wire transmission line as to permit the second moving-wire transmission line to move within the second longitudinally extending channel in response to a predetermined threshold movement of the cable sensor. The first channel and the second channel can have a same or a different configuration compared to the other, and the first moving-wire transmission line and the second moving-wire transmission line can have a same or a different configuration compared to the other.

The signal emitted by the transmitter can include a coded pulse and the circuitry can be configured to perform a matched filter operation between the coded pulse and the corresponding contra-directional signal to detect and to locate the disturbance along the cable sensor.

In an embodiment the processor is a first processor and the fence disturbance sensor can include the other device, with the other device being a second processor coupled with the second end of the cable sensor. The second processor can have a signal transmitter coupled (e.g., electrically) with the central transmission line and be configured to emit a signal on the central transmission line in time-multiplexed relation to the signal emitted over the central transmission line by the first signal transmitter. The second processor can also include a receiver electrically coupled with the movable transmission line and configured to observe a contra-directional signal corresponding to the signal emitted by the signal transmitter of the second processor over the central transmission line. The second processor also can include circuitry configured to compare the contra-directional signal observed by the receiver of the second processor in relation to a plurality of time-delayed versions of the signal emitted by the transmitter of the second processor. Further, the circuitry of the second processor can be configured to detect and to locate a disturbance along the cable sensor in correspondence with an observed delay between the time the signal is emitted on the central transmission line by the second processor and the time a change in the contra-directional signal is observed by the second processor.

In an embodiment, the circuitry of the first processor is further configured to receive a modulated response from the second processor and to determine whether the modulated response from the second processor correlates with the contra-directional signal observed by the receiver of the first processor.

In an embodiment, the circuitry of the first processor is further configured to cause the first processor to declare an event when the modulated response from the second processor correlates with the contra-directional signal observed by the receiver of the first processor.

The circuitry of the first processor can be configured to receive from the second processor an encoded indication of the presence and location of a disturbance determined by the second processor. In an embodiment, the circuitry of the first processor is configured to cause the first processor to declare an alarm when the presence and location of the disturbance determined by the second processor corresponds to the presence and location of the disturbance determined by the first processor.

The first processor can deliver electricity over the cable sensor, and the second processor can receive the electricity from the cable sensor, to power operation of the second processor.

In another respect, security installations are disclosed. Such a security installation can include a fence line having a fence fabric and a cable sensor coupled with the fence fabric. The cable sensor can extend from a first end to a second along the fence line. The cable sensor can have an active transmission line extending longitudinally of the cable sensor and a moving-wire passive transmission line extending longitudinally of the cable sensor. A first processor can be coupled with the first end of the cable sensor and a second processor can be coupled with the second end of the cable sensor. One or both of the first processor and the second processor can use time-domain reflectometry to detect and locate a disturbance to the cable sensor indicated by movement of the moving-wire passive transmission line.

For example, one or both of the first processor and the second processor can be configured to emit a corresponding signal into the active transmission line (e.g., an electrical conductor), e.g., in time-multiplexed relation to the signal emitted by the other processor over the active transmission line. One or both of the first processor and the second processor can be further configured to apply a matched filter to detect and locate the disturbance to the cable sensor from a reflection carried by the moving-wire passive transmission line of the signal emitted by the respective processor.

The signal emitted by one or both of the first processor and the second processor can include a coded pulse. In an embodiment, the cable sensor further has a longitudinally extending dielectric core overlying the active transmission line. The dielectric core can define a longitudinally extending channel positioned radially outward of the active transmission line and the moving-wire passive transmission line can be positioned within the longitudinally extending channel. In an embodiment, the longitudinally extending channel is so sized relative to the moving-wire passive transmission line as to permit the moving-wire passive transmission line to move within the longitudinally extending channel in response to a predetermined threshold movement of the fence fabric.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION OF THE EMBODIMENTS

The following disclosure relates to systems and methods for detecting intruders past an outdoor perimeter, and related systems and methods. More particularly, but not exclusively, this disclosure relates to a Coupled Line Reflectometer (CLR) sensor line where a disturbance occurs along an enclosed perimeter. Thus, systems having attributes that are different from those specific examples discussed herein can embody one or more presently disclosed principles, and can be used in applications not described herein in detail. Accordingly, such alternative embodiments also fall within the scope of this disclosure.

I. Overview

Figure 1:
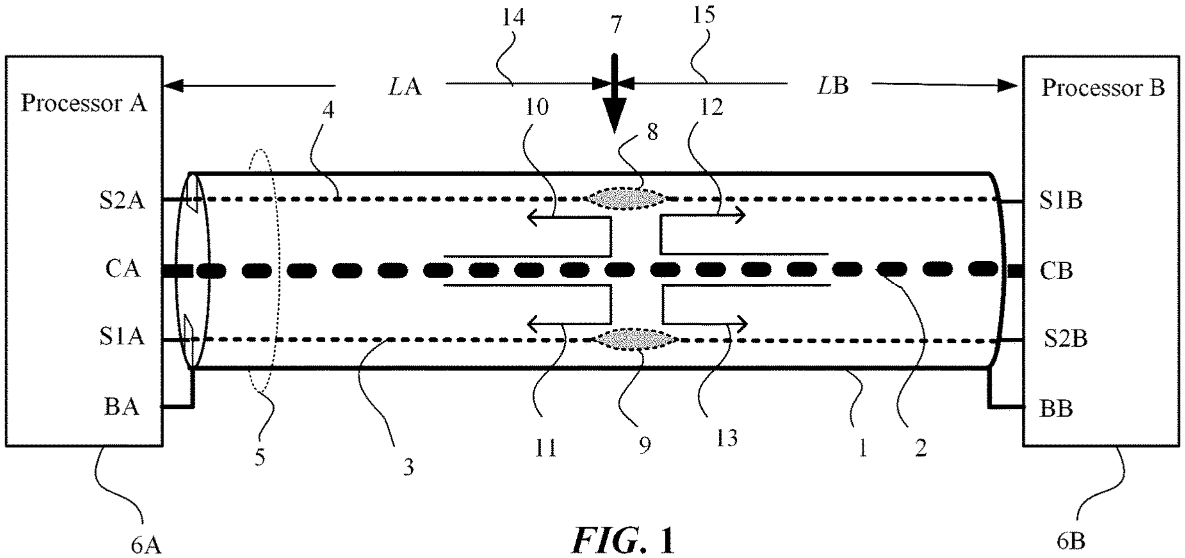
FIG. 1 schematically illustrates a fence disturbance detector having a cable sensor installed on a fence line and processors at opposite ends of the cable sensor to provide end-to-end correlation of observed signals.
Figure 2:
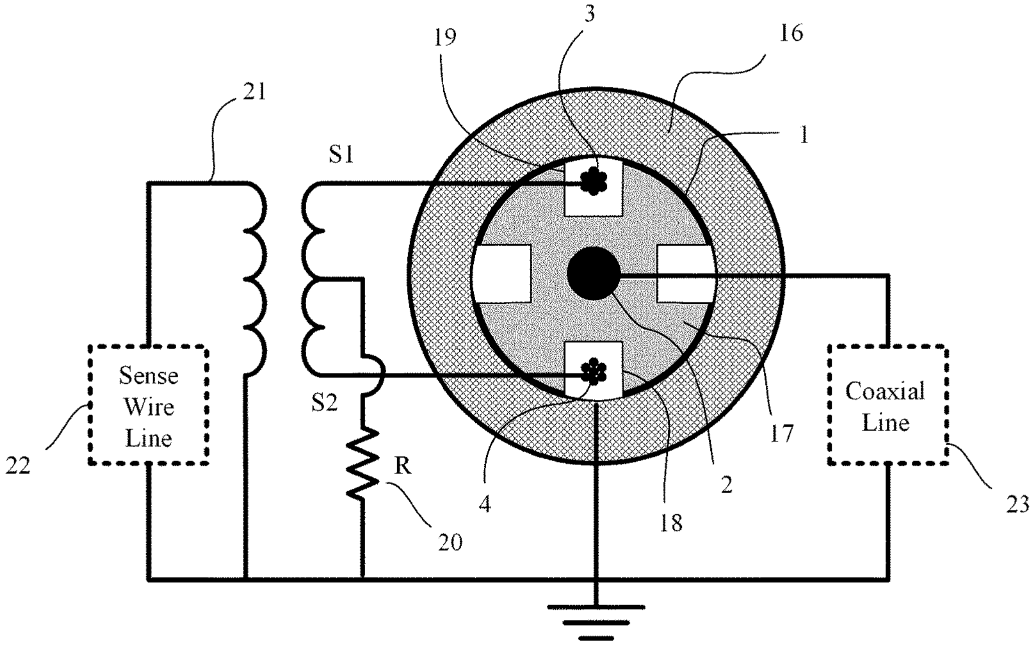
FIG. 2 schematically illustrates signal transmission lines incorporated in the detector shown in FIG. 1, overlaid on a schematic illustration of a cross-sectional view of a cable sensor as in FIG. 1.

As indicated in FIGS. 1 and 2, a sensor cable 5 can be arranged as a coaxial cable having one or more (e.g., two, three, four, or more) longitudinally extending slots 18, 19 defined by the outer surface of a dielectric core 17 (FIG. 2). A small sense wire 3, 4 can "float" (e.g., is free to move) within each slot, defining a moving-wire transmission line that can also be considered a "wire-in-tube" sensor. As shown by the cross-sectional view in FIG. 2, the sense wires 3, 4 can be positioned opposite each other relative to the dielectric core 17 and the central conductor 2 within the core.

In FIG. 1, a signal processor 6A, 6B is positioned at each of the opposed terminal ends of the sensor cable 5. Each processor 6A, 6B can be configured to transmit a signal over the primary or central conductor 2 (coaxial line). For example, the signal can be a Pseudo Noise (PN) coded, pulse-modulated RF signal. In an embodiment as shown in FIG. 1, the transmission from one processor (e.g., processor 6A) can be time multiplexed with the transmission from the other processor (e.g., processor 6B). Such multiplexing can ensure that only one signal transmission is present in the cable at any given time.

In the embodiment shown in FIG. 1, each processor 6A, 6B includes a transmitter and a receiver. The transmitter sends a signal, e.g., a PN encoded RF signal, down the coaxial line of the sensor cable. The signal propagates down the coaxial line 23 at a velocity corresponding to the dielectric constant of the core. As the RF signal propagates down the coaxial line, energy couples into the moving-wire transmission line 22. The impedance of the moving-wire transmission line can correspond in part to a position of the sense wires 3, 4 in the slots 18, 19 relative to the outer conductor 1 (ground) of the coaxial line. When the cable 5 is disturbed, the sense wires can move in their respective slots, changing the impedance of the moving-wire transmission line 22. The change in impedance causes a portion of the RF transmission to be reflected back towards the processor (e.g., processor 6A) that emitted the transmission. The RF signal reflected from the location at which the cable was disturbed (indicated by arrow 7) propagates on the moving-wire transmission line at a velocity corresponding to the dielectric material around the sense wires 3, 4. When the reflected signal reaches the processor (e.g., processor 6A), that processor's receiver compares the received response to a plurality of time delayed versions of the transmitted PN sequence (or other signal). Through this correlation process, the processor (e.g., 6A) can determine the presence and location of the disturbance 7 along the length of the sensor cable 5. As described more fully below, computed measurement units can be range bins, which can be converted to a physical distance.

The time multiplexed operation of the processors at both ends of the sensor cable enables both processors 6A, 6B to contemporaneously detect and locate the disturbance 7, as seen from each end of the sensor cable 5. In an embodiment, the processed response data from one processor (e.g., processor 6A) can be communicated over the sensor cable 5 to the other processor (e.g., processor 6B) on the other end of the sensor cable. In a preferred embodiment, these data can be sent in real time with, e.g., the PN coded transmission, on the coaxial line albeit at a higher carrier frequency. This approach allows one processor to effectively "see" the disturbance from both ends of the sensor cable contemporaneously, which in turn permits the one processor to assess a degree to which the observations of both processors correlate with each other.

The autocorrelation of the transmitted signal (e.g., PN coded transmission) with the reflected signal (e.g., PN response) can be performed using a matched filter operation providing a process gain of N where N is the length of the PN sequence. In a preferred embodiment, $N=2^{12}-1=4095$ chips.

Each processor that receives data from the other processor on a given cycle is referred to herein for convenience as the "lead processor." The lead processor can combine the responses obtained from both ends of the sensor cable 5 in a process called End-to-End Correlation (E2EC). A given disturbance 7 typically has a peak magnitude response in one range bin seen from the lead processor. The disturbance 7 is detected in one of the n range bins that correspond to the length of sensor cable 1. The peak range bin seen from the lead processor is referred to herein as "p." Likewise, the disturbance 7 will have a peak response in one range bin as seen by the second processor which we shall refer to as q. Range bins p and q are said to be complementary. As complementary range bins p+q is the length of the sensor cable measured in range bins. All real cable disturbances will contemporaneously appear in complementary range bins as part of the E2EC process.

Each range bin response is a complex number having a real component and an imaginary component when viewed in rectangular coordinates or a magnitude and a phase when viewed in polar coordinates. In the E2EC process, the complex product of the complementary range bin responses is computed. The response magnitude decays exponentially with distance due to attenuation in the sensor cable. Hence, for complementary range bins the E2EC magnitude remains constant since p+q is constant and the response phase increases linearly with distance for a uniform dielectric of the sensor cable. Hence for complementary range bins the E2EC phase also remains constant since p+q is constant. As a result of E2EC, the response has a uniform magnitude and a uniform phase along the length of the sensor cable.

In some embodiments, E2EC has been found to exhibit an even more advantageous property relating to the motion of the sense wires. The moving-wire transmission line motion that arises in response to a cable disturbance 7 creates a response which one can think of as a decaying audio signal having a frequency response in the 3 Hz to 100 Hz range. Since both processors 6A, 6B look at the same disturbance 7, the "audio" responses observed by both processors are correlated with each other. As a result, the E2EC results in a constant phase response that is proportional to the energy in the audio. This remarkable property enhances the SNR of the detection system.

In a preferred embodiment, each range bin is approximately 11.5 meters long (e.g., between about 11 meters and about 12 meters). Longer or shorter range bins can arise according to variations in physical properties of the cable, e.g., the dielectric constant of the cable core 17. There can be up to 48 range bins seen from end A and 48 range bins seen from end B. When the sensor is installed, the range bins of the processor on end A of the cable can be arranged to bisect the range bins seen from end B. Hence there can be as many as 96 Correlated Range Bins (C-Bins) each being about 5.8 meters long (e.g., between about 5.5 meters and about 6 meters). When a target is seen in range bin p as seen from end A and in range bin q when seen from end B of the cable, a target is said to be in C-Bin p·q.

When taking the complex product during the E2EC process both the conjugated and the non-conjugated product of the responses in range bins p and q can be considered. The non-conjugated phase from the E2EC process can essentially be a constant that depends on the length of the sensor cable 5. The conjugated phase of the E2EC process rotates in proportion to distance along the cable. This conjugated phase can be used to precisely locate the target within the C-Bin.

When the sensor depicted in FIG. 1 is first installed on a fence line (not shown), e.g., mounted to a fence fabric (not shown), the sensor is calibrated. To calibrate the system in FIG. 1, the installer can walks along the length of the sensor cable 5 rattling the fence fabric, e.g., with a screwdriver. The sensor detects, locates, and stores the magnitude of the response from each rattle into a sensitivity profile based on the peak magnitude observed in each meter of the perimeter cable. The location within each C-Bin is based on the conjugated phase of the response. This sensitivity profile can be used as the basis for selected a detection threshold for each meter of sensor cable.

As a consequence, for a disturbance to be declared as a legitimate target through the E2EC process, the disturbance should be detected at the same time, at the same location and have the same audio. This provides a dramatic increase to SNR in the detection process compared to SNR obtained by prior technologies.

In an embodiment, a DC power can be superimposed on the coaxial line to power multiple processors from one location. In these embodiments, in addition to the sharing of process data, the frequency multiplexed communication over the sensor cable can be used for general Alarm annunciation and for maintenance and diagnostic tools.

It is contemplated that a Coherent Phase Chip in a coded sequence transmission such as the PN coded sequence used in CLR can be viewed as equivalent to a Coherent Pulse transmission. When a target is located within a particular range bin, the output of the correlator for that range bin has the properties of a phase coherent pulse transmitted and reflected from the disturbance.

In the preferred embodiment of the invention the Coherent Phase Chip is equivalent to a Coherent Phase Pulse. There is exactly one cycle of sinewave in the pulse. Since there are two range bins per chip there is exactly $2\pi$ radians of phase per range bin and since there are two C-Bins per range bin there are exactly $2\pi$ radians of phase per C-Bin. Hence theoretically when the fence is rattled passing through a C-Bin the phase starts at $-\pi/2$ and ends at $+\pi/2$. Location based solely on phase is not practical since phase measurement is ambiguous beyond $+/-\pi$ radians. In practice a target is said to be in a particular C-Bin when the peak magnitude of the response is larger in the particular C-Bin relative to the two neighboring C-Bins. This measurement of location based on magnitude is typically corrupted by noise and the shape of the pulse but it is adequate to resolve the ambiguity associated with phase. The end result is a very precise measure of location based on the phase of the response.

Another significant benefit of this technology when installed in a network is that it can provide fail-safe operation. For example, if a sensor cable 5 is cut to define two cable segments, the processors 6A, 6B on the opposed ends of the cable continue to detect and locate disturbances occurring between the end of the cable to which each is connected (the relative proximal end) and each respective terminal end defined by the bisecting cut (the relative distal end). Other TDR based fence sensors cannot detect cable disturbances beyond the cut.

Other, related principles also are disclosed. For example, the following describes machine-readable media containing instructions that, when executed, cause a processor of, e.g., a computing environment, to perform one or more disclosed methods. Such instructions can be embedded in software, firmware, or hardware. In addition, disclosed methods and techniques can be carried out in a variety of forms of processor or controller, as in software, firmware, or hardware.

II. Coupled Line Reflectometer With E2EC

Operation of a Coupled Line Reflectometer (CLR) sensor with E2EC is described in relation to the embodiment shown in FIG. 1. (The sensor cable 5 shown in FIG. 1 is not to scale.). Outer conductor 1 and center conductor 2 define a coaxial transmission line 23 (FIG. 1). Sense wires 3 and 4 define a two-wire moving-wire transmission line 22 (FIG. 2), with outer conductor 1 being a ground reference common to both transmission lines 22, 23.

The cross-sectional view of the cable 5 shown in FIG. 2 reveals details of the cable's construction. The electrical schematic overlaid on the cross-sectional view schematically shows the coaxial transmission line 23 is formed by outer conductor 1 and center conductor 2 and the moving-wire transmission line 22 is formed by sense wires 3 and 4 and shares the same ground reference as the coaxial line, i.e., conductor 1. A thin layer of insulating material is placed on the inside surface of the outer conductor 1, insulating sense wires 3, 4 from outer conductor 1. As described herein, RF signals can propagate along coaxial line 23 and couple onto the moving-wire transmission line 22.

Signal processors 6A and 6B connect to the opposed A and B ends of sensor cable 5 using RF transformers 21A and 21B respectively. The sense wire line formed by sense wires 3 and 4 operate as a balanced two wire transmission line. RF transformer 21 converts the balanced mode of the two-wire line into the unbalanced moving-wire transmission line 22. The unbalanced mode of the two wire line formed by sense wires 3 and 4 relative to outer conductor 1 is terminated in a resistive load 20 having a resistance of R Ohms such that it matches the characteristic impedance of the unbalanced mode of the two wire line. The termination, such as that shown in FIG. 2 is applied at each end of the sensor cable to connect the transmission lines to the RF circuitry inside each processor.

Processor 6A at end A of sensor cable 5, and processor 6B at end B of sensor cable 5, are time multiplexed. During time slot A, processor 6A transmits an RF coded pulse from end A to end B on the coaxial line 23A of the cable. During time slot B processor 6B transmits an RF coded pulse from end B to end A on the coaxial line 23B of the cable. To put FIG. 1 into perspective, the sensor cable 5 connecting processors A and B is typically between 40 and 400 meters long and the cable including jacket 16 (FIG. 2) is 0.240 inches in diameter.

As the RF coded pulse propagates along coaxial line 23, energy couples into the moving-wire transmission line 22 formed by sense wires 3 and 4. The energy coupling into the unbalanced mode of the two-wire moving-wire transmission line appears at the sense wire terminals 22A and 22B. While transmitting from end A, the coupled energy arriving at terminals 22B is due to forward coupling, which is also referred to as co-directional coupling. While transmitting during time slot A from end A, the coupled energy arriving at terminals 22A is due to backwards coupling, this is referred to as contra-directional coupling. Both co-directional and contra-directional coupling occur during time slot B but in opposite directions.

The time-multiplexed, contra-directionally coupled signals appearing on the unbalanced mode terminals 22A and 22B can be used to detect and locate disturbances along the length of the cable. The time delay between the onset of the coded pulse transmission and the receipt of the change in the contra-directional coupling caused by a disturbance of the cable is used to locate the disturbance. Hence cable disturbance 7 will be detected and located a distance 14 measuring LA meters from processor 6A contemporaneously with it being detected and located a distance 15 measuring LB meters from processor 6B. The total length of the cable is L=LA+LB. Referring to contemporaneous detection of the disturbance is a relative statement; the time it takes to multiplex the transmissions from end A and end B is much longer in duration than the time it takes for a transmission to propagate to and reflect from the disturbance 7, and yet fast enough to detect movement of the sense wire 3, 4 in response to a disturbance 7 at both processors 6A, 6B. Stated differently, movement (e.g., mechanical vibrations) of one or both sense wires 3, 4 in response to a disturbance 7 to a fence line or the cable 5 continues for a substantially longer duration than the time it takes the processors to multiplex the transmissions from end A and end B and the transmissions to propagate to and reflect from the disturbance 7.

It is important to realize that contra-directional coupling between the coaxial line and the moving-wire transmission line occurs all along the length of sensor cable 5. When there are no disturbances the sense wires 3 and 4 find a rest position in the slots 18, 19. One can think of the sense wires having a rest position that is supported by touch points on the walls of the slot. The exact location of the touch points is random. The touch points will be determined when the cable is attached to the fence fabric. When disturbance 7 occurs the sense wires at that location vibrate as illustrated by 8 and 9 in FIG. 1.

The digitized, contra-directionally coupled, coded-pulse transmission is passed through a correlator in the activated processor where the response is broken into range bins corresponding to finite lengths (or segments) of the cable 5. The correlator provides In-phase (I) and Quadrature-phase (Q) outputs from each range bin at the end of time slot A and time slot B. This operation is much like that of a radar system. When there are no disturbances, the I and Q responses in each range bin are referred to as the clutter. Clutter is a measure of the sense wire's location within the slot while at rest. As part of the Digital Signal Processing (DSP) the clutter is estimated and then removed using digital filters to derive the incremental dI and dQ target responses in each range bin. Should the sensor cable be cut the clutter will change dramatically and it can be used to locate the cut.

In order to explain the operation of the sense wires in response to a disturbance it is convenient to think of sense wire 3 and outer conductor 1 forming a first image line and sense wire 4 and outer conductor 1 forming a second image line. The impedance of such image lines increases with the distance between the sense wire and the outer conductor. The balanced sense wire mode is due to the two image lines in parallel and the unbalanced sense wire mode is due to the two image lines in series. When the cable moves, sense wires 3 and 4 tend to move relative to the cable in the same direction as each other due to their inertia and the mechanical decoupling from the cable sensor provided by the over-sized slots 18, 19. Thus, the movement of the sense wires 3, 4 is in an opposite direction relative to a direction of movement of the outer conductor 1. This causes the first image line impedance to increase while the second image line impedance to decrease. The change in impedance of the image lines creates a reflection in the unbalanced moving-wire transmission line responses seen at the output of transformers 22A and 22B. Hence there are incremental dI and dQ target responses in the range bins associated with the location of the disturbance 7 as seen from both ends of the sensor cable 5.

The coded pulse is a Pseudo Noise (PN) sequence phase modulation of the PN carrier frequency. The code in a preferred embodiment is $2^{12}-1=4095$ chips long. When correlated, all of the chips in the transmission add up to 4095 and when not correlated the chips add up to −1. As a result, the correlator provides a processing gain of 4095. Once passed through the correlator the coded pulse looks like a rectangular burst of carrier frequency that is 4095 time larger than the amplitude of each chip in the transmission. Each range bin output has the approximate shape of the convolution of a rectangular pulse which becomes a triangular shape with a base that is two chips long. When band limited, the triangle has a rounded peak and corners. The range bin outputs are effectively samples of the convolved response. The response to a disturbance will appear in 3 consecutive range bins with the peak being in the range bin where the disturbance 7 is located. The angle of the conjugated phase in the peak C-Bin is used to precisely locate the disturbance within the C-Bin.

In order to optimize the E2EC process, the range bins as seen from end A and seen from end B can be arranged so as to bisect. Hence the output of E2EC can have correlated range bins (C-Bins) that are half a range bin in length. As a consequence, a disturbance will generate a response in at least 5 C-Bins.

The dimensions of the cross-section of a sensor cable 5 for a preferred embodiment of the cable as seen in FIG. 2 are presented below, though other configurations and dimensions are possible. Center conductor 2 can be a copper clad aluminum conductor having a diameter of 0.032 inches. Outer conductor 1 can be a tinned copper braid over a Mylar backed aluminum foil having a diameter of 0.170 inches. The Mylar backing of the aluminum foil can provide insulation between the outer conductor 1 and the sense wires 3, 4. Sense wires 3 and 4 can include, for example, 7 strands of 34 AWG tinned copper wires having a diameter of 0.0189 inches. The slotted core 17 can have four circumferentially symmetric slots that extend longitudinally along an outer surface of a polyethylene extrusion placed over center conductor 2, though other embodiments have more or fewer slots. In FIG. 2, the sense wires 3 and 4 are inserted into opposing slots 18 and 19. The remaining two slots are left unoccupied by sense wires (though they could also house additional sense wires). The unoccupied slots provide symmetry to the design and the air void that they present reduces dielectric losses of fields propagating along the length of the cable. Typical electrical properties of such a cable are;

Coaxial Line Impedance Zc=65 Ohms
Coaxial Line attenuation αc=6 dB/100 meters
Coaxial Line velocity vc=66% free space
Sense Wire Line Differential Impedance Zs=140 Ohms
Sense Wire Line attenuation αs=5.5 dB/100 meters
Sense Wire Line velocity vs=77% free space Processors 6A and 6B are shown attached to the A and B ends of sensor cable 5 in FIG. 1. In an embodiment, each processor is a direct digital transceiver. In order to implement E2EC the incremental response data from the processor on the B end of the cable is sent to the processor on the A end of the cable to be correlated with the response from the A end of the cable. These data along with general message data can be frequency multiplexed over the coaxial line of the sensor cable 5.

Figure 3:
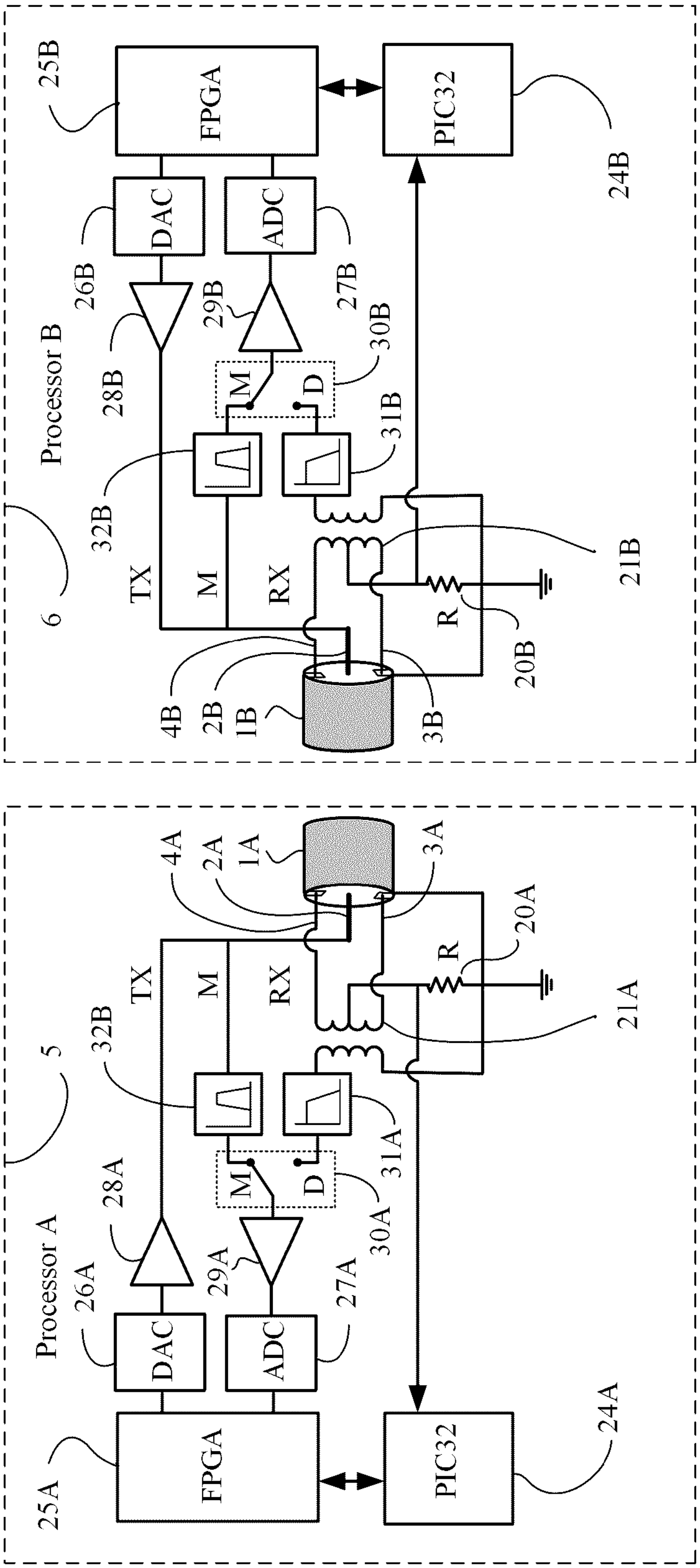
FIG. 3 schematically illustrates a functional block diagram of the processors shown in FIG. 1.

A more detailed block diagram of the processor hardware is presented in FIG. 3. As illustrated in FIG. 3, the components in processor A are numbered followed by the letter A and the components in processor B have the same reference number followed by the letter B. Since processor A is identical to processor B the following description applies to both processors.

Transformer 21 connects to sense wires 3 and 4. The center tap of the input winding provides access to the unbalanced mode of propagation on the sense wires and it can be terminated through the characteristic impedance R to ground. The output of the transformer can provide access to the balanced sense wire mode with the transformer converting it from balanced to unbalanced mode to connect to lowpass filter 31. Lowpass filter 31 is designed to pass the main lobe of the PN coded response while rejecting higher frequency messaging. The output of lowpass filter 31 connects to the D (Detection) port of RF switch 30. With RF switch 30 in position D the received contra-directional response is passed to input amplifier 29 on to the Analog to Digital Converter 27. The digitized received signal is passed to Field Programmable Gate Array (FPGA) 25.

The PN coded pulse and message are combined in FPGA 25 and sent to Digital to Analog Converted (DAC) 26 and onto output amplifier 28. The amplified transmit signal connects to the coaxial center conductor 2 to propagate down the coaxial line in sensor cable 5, as can be seen in FIG. 2.

The M (Message) port of RF switch 30 is used to receive messages from the processor on the other end of sensor cable 5 during the appropriate time slot. The message signal is passed though bandpass filter 32 to amplifier 29 and ADC 27.

High speed DSP is performed inside FPGA 25. The range bin responses are processed and the audio output per C-Bin is passed to PIC32 microcontroller 24 where the actual target gets located and the magnitude compared to the appropriate threshold to detect an intruder.

Figure 4:
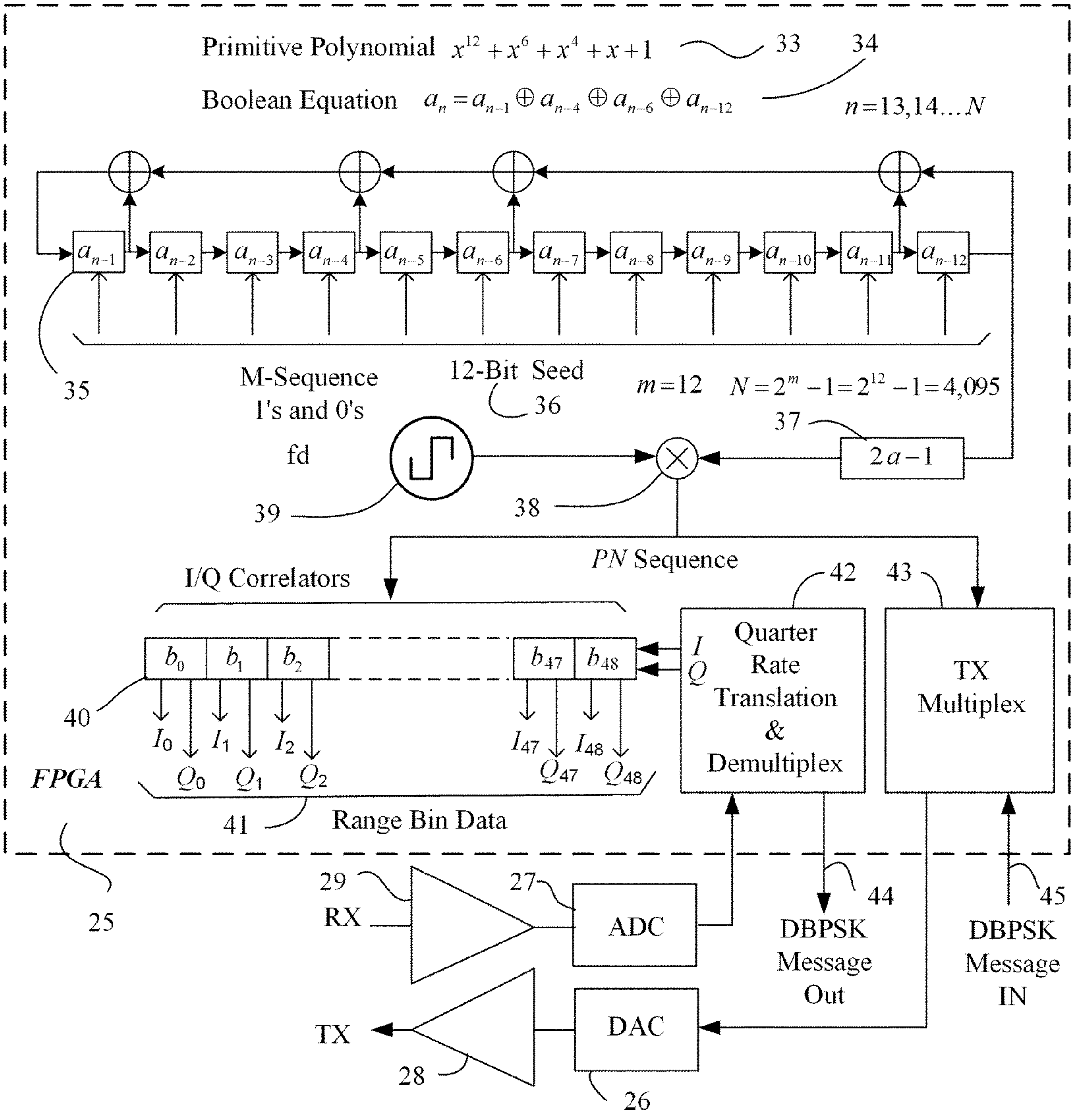
FIG. 4 illustrates an embodiment of detection-related functions as can be implemented in a field-programmable gate array (FPGA) or other integrated circuit device.

An overview of the detection related functions inside FPGA 25 is presented in FIG. 4.

The PN code can be generated by Linear-Feedback Shift Register (LFSR) 35. The feedback taps in the shift register can be defined by Primitive Polynomial 33 and Boolean Equation 34. As the name (Pseudo Noise) implies the output of the LFSR can have properties of random numbers even though the output is deterministic—in this case it generates 4095 bits (1 s and 0 s) and then repeats. The output of the LFSR is level shifted in 37 and mixed with the carrier frequency 39 in mixer 38 to generate the input to range bin correlator 40 and transmit multiplexer 43. It resulted in a Binary Phase Shift Keyed (BPSK) coded RF transmission. Transmit multiplexer 43 frequency multiplexes the PN coded sequence and the message being sent to the neighboring processor.

The signal received on the moving-wire transmission line 22 is passed through amplifier 29 to ADC 27. The digital output of ADC 27 is down converted using quarter rate translation in de-multiplexer 42 into the base band response to the PN coded transmission and the message being received from the neighboring processor.

Quarter rate translation can be performed by digitizing at exactly four times the carrier frequency. In this approach, every other sample is In-phase (I) with the intermediate samples being of Quadrature-phase (Q). Alternate I and Q samples are inverted to complete the down conversion process.

The term "quarter rate translation" is used in the textbook by Richard Lyons to describe this form of direct digital receiver. Effectively the RF signal is digitized directly and the samples arranged to generate the baseband receiver I and Q responses.

The PN coded transmission output of de-multiplexer 42 has an I and a Q component. The I/Q coded response is then passed to range bin correlator 40 where it is correlated with time delayed versions of the PN sequence into 48 range bins. There are I and a Q outputs for each of the 48 range bins. The time delay between taps of the PN correlator are each one half chip long. This means that one range bin corresponds to 11.52 meters of sensor cable.

The message output of de-multiplexer 42 has an I and a Q component representing the DBPSK message from the neighboring processor at a carrier frequency of 18.75 MHz.

The receiver portion of the processor is referred to as a direct digital receiver. By digitizing the PN code at $\frac{1}{16}^{th}$ the PN carrier frequency and the Message at one quarter the message carrier frequency the baseband I and Q samples are obtained directly using quarter rate translation.

As a result of quarter rate translation the RF signal is down converted to base band in the process with the I and Q samples representing the magnitude and phase of the RF signal in rectangular coordinates. This process is performed for both the PN coded response and the DBPSK response in de-multiplexer 42.

A lookup table is used in the FPGA to generate the RF transmission. Each chip in the PN code is represented by a single cycle of a sine wave. With a carrier frequency of fd for the PN code it means a chip is 1/fd seconds long. The sign of the +/−1 sign of the PN code chip determines if the phase of the single cycle burst is inverted or not inverted. This means that transmission is fully phase coherent with each chip. This means that the output of correlator 40 presents a fully phase coherent pulse.

Correlator 40 produces two range bins per chip. The fact that there are two range bins per chip is important in terms of using phase to locate targets.

Figure 5:
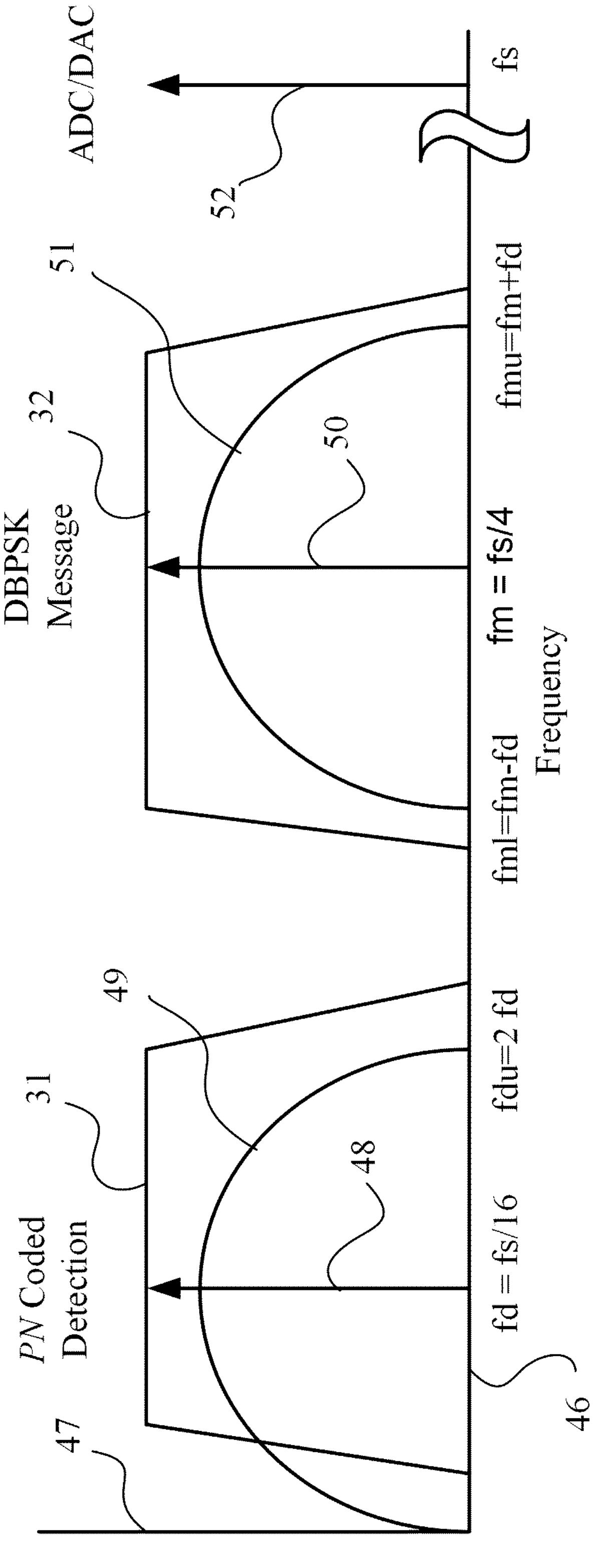
FIG. 5 shows a spectrum of a signal transmitted by a processor in a disclosed embodiment.

The spectrum of the transmitted signal in the preferred embodiment of the invention is shown in FIG. 5.

In order to use quarter rate translation, the signaling design can be based on the ADC and DAC sample rate fs. The carrier for detection 48 is at fd=fs/16. The carrier for messaging 50 is at fm=fs/4. Both the detection code and the message code can use binary phase shift keying. This means that both the PN coded transmission for detection and messaging have the familiar sine(x)/x frequency distribution. The main lobe 49 of the PN coded transmission is centered about the carrier 48. It extends from DC to fdu=2 fd. The main lobe 51 of the message is centered about the carrier 50. It extends from fml=fm−fd to fmu−fm+fd in a preferred embodiment.

| | | |
|---|---|---|
| fs | 75 | MS/s |
| fm | 23.4375 | MHz |
| | 18.75 | MHz |
| | 14.0625 | MHz |
| | 9.375 | MHz |
| fd | 4.6875 | MHz |

In order to utilize quarter rate translation to down convert the RF signals to based band signals DAC 28 outputs data at fs and ADC 27 digitizes the received data at fs. The ADC and DAC rates are represented by a line at fs in FIG. 5. Both DAC 28 and ADC 27 are 12 bit devices. The horizontal axis 46 is frequency and the vertical axis 47 is magnitude.

Each chip in the PN coded transmission and bit in the message transmission is 1/fd seconds long. Hence the first null of the PN transmission goes from DC to 2 fd and the first null of the message goes from fm−fd to fm+fd. The frequency responses of filters 31 and 32 are also shown in FIG. 5. The lower corner frequency of filter 31 is at 1.8 MHz. It cuts off part of the lower have of the PN main lobe so as to remove any AM radio stations that may get into the sensor cable.

Messages can be encoded using Differential Binary Phase Sift Keying (DBPSK) and then encoded with the PN code so as to retain the sine(x)/x distribution 51. In DBPSK encoding the phase of the message carrier frequency 50 is inverted relative to the previous bit to send a "1" and left at the same phase relative to the previous bit to send a "0". This differential process avoids the need for the processors to share a reference clock.

The PN coded transmission with frequency multiplexed DBPSK data is time multiplexed into two time slots, A and B. During time slot A the processor 6A transmits its coded pulse sequence with its frequency multiplex DBPSK message on the coaxial line 23. The coupled signal on moving-wire transmission line 22 is processed in processor 6A contemporaneously with the DBPSK message being received by processor 6B. During time slot B the processor 6B transmits its coded pulse sequence with its frequency multiplex DBPSK message on the coaxial line 23. The coupled signal on moving-wire transmission line 22 is processed in processor 6B contemporaneously with the DBPSK message being received by processor 6A.

The PN coded transmission received during time slot A and passed through the range bin correlator 40A allows processor A to locate disturbance 7 in a particular range bin. The PN coded transmission received during time slot B and passed through the range bin correlator 40B allows processor B to locate disturbance 7 in a particular range bin. In this way disturbance 7 is detected and located contemporaneously by both processor 6A and processor 6B.

The messaging between processors serves two important functions. The first is to share the complex incremental dI and dQ target responses between the processors on the A end and B end of the sensor cables to implement E2EC. The second function is to communicate alarm data and maintenance/diagnostic data around a network of processors to the head-end.

As shown in FIG. 4 correlator 40 output for end A and end B are $IA_{n,i}$, $QA_{n,i}$ and $IB_{n,i}$, $QB_{n,i}$ where n=1, 2, . . . , 48 denoting the range bins and the subscript i being the sample number are processed in the FPGA. The subscript i increments with each period of the time multiplexing of end A and end B.

In an embodiment, each range bin corresponds to 11.5 meters of cable 5. The index n increases with each successive range bin down the length of cable. When a disturbance occurs, it will create a response in five range bins with the peak occurring in the range bin where the disturbance is located. Let the range bin number where the peaks as seen from the A end of the cable be p. At the same time, the peak as seen from the B end, will be in the complementary range bin q. A fundamental property of E2EC is that to be considered as an Event and ultimately an Alarm the response must appear contemporaneously in complementary range bins.

DSP can be used to detect and locate disturbances along the sensor cable in real time. Each disturbance should appear as changes in the In-phase (I) and quadrature phase (Q) responses in the complementary range bins. The changes in the rectangular I and Q responses represent a magnitude and phase in polar coordinates. The magnitude is the square root of the sum of the squares of the changes in I and Q. The phase is the arctangent of the changes in I and Q. During the E2EC process the complex product is taken of the complex responses in complementary range bins (C-Bin) for each sample period.

The first step in the DSP is to remove the clutter from the sampled data. With no targets present each range bin will have a response which is referred to as clutter. This is like clutter in Moving Target Indicator (MTI) radar. As in MTI radar the clutter is removed using highpass digital filter 48. There is a highpass filter for each I and Q component in all rage bins for both sides of the processor. In implementing the CLR system we have found that it is advantages to estimate the clutter using a two stage exponential averaging filter of the form $$y_i = ax_i + (1-a)y_{i-1} \quad (1)$$

$$z_i = ay_i + (1-a)z_{i-1} \quad (2)$$

This is a unity gain lowpass filter with input $x_i$ and output $z_1$. Filter constant a determines the corner frequency of the lowpass filter. We have found that setting a=0.02329 a corner frequency of 3 Hz is realized and the filter is effective in estimating the clutter which is then subtracted from the input signal to derive the output of the highpass filter $$\delta x_i = x_i - z_i \quad (3)$$

This filter is applied to all correlator I and Q outputs to remove clutter and determine the change due to the presence of a disturbance of the fence and hence the sensor cable. In addition to describing the target response this sample includes noise such as that introduced by the front end amplifiers.

Lowpass filters 49 are used to remove as much of this noise as possible without attenuating the target response. We have found that a two stage exponential averaging filter as defined in equations (1) and (2) is very effective in removing noise while preserving the target. A corner frequency in the range of 30 to 100 Hz is used. The exact corner frequency is selected by the installer to optimize the sensor performance on the specific fence in question.

The objective of E2EC is to correlate the response seen on end A with that seen on End B. The response seen on end B is derived by the neighboring processor 6B and sent as a message to processor 6A to be processed. Because processors 6A and 6B time multiplex at 545 Hz the PN coded transmission on sensor cable 1 there is a slight time delay between the data for end A and B. Hence to estimate the samples values at the same instant of time Boxcar Filter 50 is applied to the A side data. In essence it takes the average of the sample before and after the B sample thereby creating an effective sample at the same instant of time that the B sample is taken.

In order to describe the benefits of the E2EC process it is convenient to describe it in terms of functions of time. When the fence is disturbed the cable moves and the sense wires move in the slots in the cable core. The change in impedances caused by this motion creates a signal S(t) at the location of the disturbance on Sense Wire Line 4.

The signal received at end A of the cable is $$SA(t) = S(t)e^{-(\alpha C+\alpha S)L1}\cos(\omega t + \varnothing 1) \tag{4}$$

and the signal received at end B of the cable is $$SB(t) = S(t)e^{-(\alpha C+\alpha S)L2}\cos(\omega t + \varnothing 2) \tag{5}$$

where L1 and L2 are the distances from the disturbance to the respective end of the cable and ω is the carrier frequency (in radians/sec) of the PN coded transmission. In addition, the attenuation at the carrier frequency in the Coaxial Line as αC Nepers per meter and the attenuation in the Moving Wire Transmission Line as αS Nepers per meter (1 Neper=8.68 dB).

If we define the cable to be of length L it follows that $$L = L1 + L2 \tag{6}$$

Figure 6:
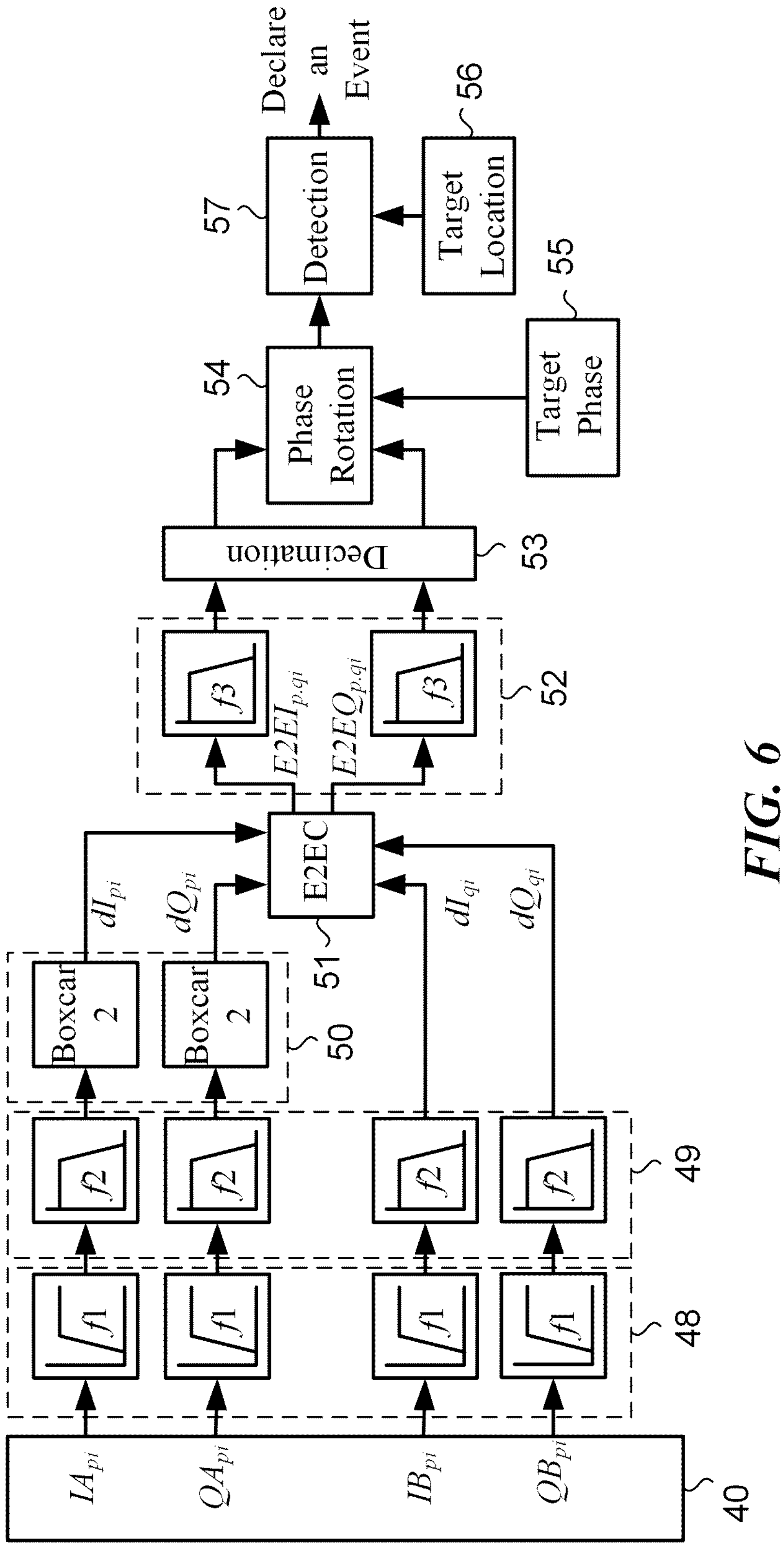

The phase of the RF transmission is determined by the velocity of propagation in the Coaxial Line and the Moving Wire Transmission Lines $$\varnothing 1 = (\beta C + \beta S)L1 \tag{7}$$

and $$\varnothing 2 = (\beta C + \beta S)L2 \tag{8}$$

where

βC=ω/vC Radians/meter where vC is the velocity in the Coaxial Line

βS=ω/vS Radians/meter where vS is the velocity in the Moving-Wire Transmission Line While the E2EC process is implemented in the DSP shown in FIG. 6 it is useful to consider it as the complex product of the time responses SA(t) and SB(t) as described in equations (4) and (5) to find $$R(t) = S(t)^2 e^{-(\alpha C+\alpha S)L1} e^{-(\alpha C+\alpha S)L2}\cos(\varnothing 1 + \varnothing 1) \tag{9}$$

Using equation (6) and recognizing that $$\varnothing 1 + \varnothing 2 = (\beta C + \beta S)\times(L1 + L2) = (\beta C + \beta S)L \tag{10}$$

Equation (9) can be simplified to $$R(t) = S(t)^2 e^{-(\alpha C+\alpha S)L}\cos[(\beta C + \beta S)L] \tag{11}$$

What is remarkable about E2EC, as shown in equation (11), is that R(t), does not depend on the location of the disturbance. The amplitude of R(t) depends on the attenuation in Coaxial Line 23 and Moving-Wire Transmission Line 22 times the total length of the cable L. The phase of R(t) depends on the phase factor of Coaxial Line 23 and Moving-Wire Transmission Line 22 and the total length of the cable.

Equation (11) provides meaning to the output of E2EC 51 for a disturbance. Specifically $$R_{p\cdot q,i} = E2EI_{p\cdot q,i} + jE2EQ_{p\cdot q,i} = S_i^2 e^{-(\alpha C+\alpha S)L}\cos[(\beta C + \beta S)L] \tag{12}$$

where $j=\sqrt{-1}$ the imaginary operator. The term $$S_i^2$$

represents the energy of the disturbance. When the fence is disturbed at C-Bin p·q the target response in the frequency passband is estimated by passing the response through lowpass filter 52.

We have found that a single stage exponential averaging filter like that in equation (1) with a=0.00392 having a corner frequency of 0.5 Hz works well at integrating the response energy over the duration of a typical strike on the fence.

With no disturbance present the I and Q outputs of the bandpass filter formed by 48 and 49 are zero mean random noise with frequency content in the passband. The E2EC complex product results in zero mean random magnitude and phase noise. When this noise is passed through lowpass filter 52 the magnitude of the noised is further reduced.

Because the output of filter 52 has only very low frequency content it is decimated in 53 without loss of response information. Typically only every $50^{th}$ sample needs to be passed from the FPGA to the PIC32 microcontroller for further processing.

Once inside the PIC32 the response is rotated by target phase 55 so that all targets will appear on the positive real axis. With no targets present the noise will be a zero mean random variable with random phase.

In dealing with response magnitude it is convenient to use the units of dBx. When considering magnitude prior to E2EC dBx is 20 log(voltage) and post E2EC dBx is 10 log(voltage squared or energy). Since deci-Bel (dB) is a relative measure the "x" simply denotes 1 bit on the ADC.

The conjugated complex product is $$R^*(t) = S(t)^2 e^{-(\propto C+\propto S)L1} e^{-(\propto C+\propto S)L2} \cos(\phi 1 - \phi 2) \quad (13)$$

Using equation (6) and recognizing that $$\phi 1 - \phi 2 = (\beta C + \beta S) \times (L1 - L2) = (\beta C + \beta S)(2L1 - L) \quad (14)$$

Equation (13) can be simplified to $$R(t) = S(t)^2 e^{-(\propto C+\propto S)L} \cos[(\beta C + \beta S)(2L1 - L)] \quad (15)$$

Comparing equation (15) to equation (12) one sees that the magnitude remains the same but the phase rotates at two times the distance L1 minus a constant phase.

Because the transmission is phase coherent with exactly once cycle per chip and the fact that there are two range bins per chip the phase of equation (15) rotates through exactly 2π radians per C-Bin. Hence the location of the disturbance in the C-Bin can be accurately determined by looking at the conjugated E2EC phase.

The disturbance is located by identifying the C-Bin with the peak response and using phase of the response within the C-Bin to accurately locate the disturbance. As such the sensor is able to detect and locate multiple simultaneous disturbances that are 3 C-Bins or more apart. If the disturbances are closer than 3 C-Bins apart they will be declared as one disturbance.

Once installed, the installer performs a "calibration rattle" to establish a Baseline Threshold. A person walks along the length of the sensor cable rattling along the fence using a large screwdriver typically about 6 inches below the cable. The system records the peak response magnitude in each range bin and C-Bin along the sensor cable. The installer applies a threshold margin to determine the meter-by-meter Baseline Threshold for the length of cable. Note that in this way the threshold level tracks changes in sensitivity that may occur along the length of the cable such as due to different types of fence, different tension from panel to panel etc.

While the preferred embodiment of the present invention is capable of locating targets well within one meter along the length of the sensor cable one needs to ask if this location accuracy is required in a typical security application. In terms of directing a CCTV camera or the security response team to assess and alarm probably 10 meter accuracy is all that is required.

Hence in the preferred embodiment of the invention we use "Precision Markers" to denote the start and end of Segments of the perimeter. The Precision Markers are created by tapping the fence at the location where the boundaries of the Segment start and end. In this way the user achieves Precise Segmentation without having many "sub bins" that would be required if one created say one meter sub-bins. Hence the use of Precision Markers allows one to create very precise Segment boundaries such as may be required at a gate or a driveway or a corner in the fence line. In cases where the processor is indoors the sensor cable going from the processor to the perimeter fence can be designated as a Segment with a very high threshold so as to avoid detecting disturbances on the lead-in.

The detection threshold is defined on a Segment by Segment basis. The magnitude of the calibration rattle through each Segment is used to set the threshold so as to provide the desired Threshold Margin for the Segment. The Threshold Margin determines the "all important" PD and NAR for the Segment.

In operation, an Event is declared in the Segment when the response exceeds the Event Threshold. The precise location as derived from equation (13) and the amount over threshold is recorded.

In practical application, it will be appreciated that many sites are longer than the maximum 400 meter length between processors. In this case multiple processors can be networked together. Power is provided to downstream processors as a DC voltage superimposed on the coaxial line. In addition to frequency multiplexing communication data from processor to processor over the coaxial line Event alarm data is sent over the sensor cable to the head-end. This substantially reduces the costly infrastructure required by other sensors.

There typically is a computer at the head-end to ultimately declare an Intrusion Alarm. Typically, the perimeter is divided into a number of Zones where a Zone is a group of Segments. Zones can include Segment for multiple processors. Traditionally the head end accepts relay closures for each detection zone. Other head ends may include a graphic perimeter map display screen in which case the location of the intrusion may be displayed as a Dot on the map display. In the context of the present invention a similar Event/Alarm process is employed but with one very important difference. The Events must be at or near the same place. This provides an even greater reduction in NAR The unbalanced mode on the moving-wire transmission line can be used to detect cable faults. To do so a dc level is sent over the unbalanced line from one processor to be measured at the processor on the other end of the cable. If the cable should be cut or damaged the dc level at the end of the cable will no longer be within a specified range and a cable fault is declared.

In the event of a cable fault the processors continue to detect and locate targets up to the cut cable much like existing CLR sensors. In this case one loses the benefit of E2EC but the system continues to detect and locate targets but with a higher NAR/FAR rate that increases with distance from the processor. This Fail Safe mode of operation is only possible when there is a processor at each end of the sensor cable.

In summary the system described as the preferred embodiment of the present invention provides high PD and low NAR/FAR largely due to E2EC. The various levels of correlation requires that a disturbance must be seen at the same time and at the same location having the same audio response.

VII. Other Embodiments

Notwithstanding that the previous description is provided to enable a person skilled in the art to make or use the disclosed principles, embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, E2EC can be applied to many other wire-in-tube sensor cables including, by way of example, a single wire-in-tube using directional couplers to separate the TX and RX signals and a cable 5 with one or more than two sense wires. E2EC can be performed using many coded sequences other than PN, such as for example, Golay and Barker codes. A number of means can be used to multiplex the messaging and the coded transmission including time and code division multiplexing. In another embodiment, the transmission occurs on the sense wires and the coupled reflection returns on the coaxial line, e.g., the reciprocal case of embodiments expressly described above in relation to FIG. 1, for example. The sensor cable can be protected by an armored layer such as a served steel winding or a BX cable with or without an extruded jacket. Optical fibers can be included in the spare slots (shown in FIG. 2) to dramatically increase the messaging capability. Alternatively (or additionally), other conductors can be included in the spare slots to increase the power distribution capability.

Disclosed sensors can be used on many different types of fences such as chain line, welded mesh and palisade. Disclosed sensors can be used on coils of razor wire on top of a fence or wall or laying on the ground. Disclosed sensors can be used on a wall to detect attempts to breach the wall such as in a warehouse or hanger. The sensor cable can be used around a vault to detect any attempt to break into the vault.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of intrusion detection systems, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of intrusion detection systems and related methods and systems and associated techniques that can be devised using the various concepts described herein.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, I reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

What is claimed is:

1. A fence disturbance sensor, comprising:

a first processor and a second processor; and a sensor cable extending from and in electrical communication with the first processor to the second processor, the sensor cable linking the first processor and the second processor in electrical communication, the sensor cable having an internal, moving-wire transmission line, wherein the first processor and the second processor are each configured to detect and to locate movement of the moving-wire transmission line, and wherein at least one of the first processor and the second processor is configured to assess in real time a measure of correlation between the movement of the moving-wire transmission line by the other of the at least one of the first processor and the second processor.

2. The fence disturbance sensor of claim 1, wherein the sensor cable includes at least two coupled transmission lines, each of the at least two coupled transmission lines permitting the transmission of a transmitted radio frequency (RF) signal along the length of each of the at least two coupled transmission lines, and wherein a movement of the moving-wire transmission line creates a change in impedance and thereby coupling to an adjacent at least one of the at least two coupled transmission lines.

3. The fence disturbance sensor of claim 2, wherein the first and second processor are adapted to time multiplex a transmitted RF signal along at least one of the at least two coupled transmission lines, the first and second processor receiving a reflected RF signal resulting from the change in impedance in the at least one of the at least two coupled transmission lines, and wherein the time delay between an onset of the transmitted RF signal, from at least one of the first processor and the second processor, and a receipt of the reflected RF signal from at least one of the at least two coupled transmission lines by the other of the first processor and the second processor, determines a distance from each of the first processor and the second processor to a location of the movement, thereby generating a correlated response and locating a fence disturbance.

4. The fence disturbance sensor of claim 3, wherein the transmitted RF signal is a transmitted pseudo noise (PN)

sequence and the reflected RF signal is a reflected PN sequence, the reflected PN sequence passing through a correlator in each of the first processor and the second processor, each correlator comprising a bank of matched filters, each bank of matched filters having at least one filter that corresponds to a range bin, each range bin corresponding to an incremental length of the sensor cable.

5. The fence disturbance sensor of claim 4, wherein quadrature detection is used to associate the correlated response with each range bin, the correlated response having an In-phase (I) response component and a Quadrature-phase (Q) response component.

6. The fence disturbance sensor of claim 5, wherein the received RF signal is digitized at a multiple of four times of a cycle of a carrier frequency of the transmitted PN sequence, such that an odd sample and an even sample provides the In-phase (I) response component and the Quadrature-phase (Q) response component directly through quarter rate translation.

7. The fence disturbance sensor of claim 6, wherein the In-phase (I) response component and the Quadrature-phase (Q) response component for each range bin are filtered to result in an incremental response describing the movement of the moving-wire transmission line corresponding to at least one range bin, the at least one range bin containing the peak magnitude of the incremental response corresponding to the incremental length of the sensor cable that corresponds to the location of the fence disturbance thereby locating a disturbance to the nearest range bin.

8. The fence disturbance sensor of claim 7, wherein the range bins from one of the first processor and the second processor bisect the range bins from the other of the first processor and the second processor, the bisecting range bins from each of the first processor and the second processor resulting in a set of complementary range bins, each complementary range bin sharing the same incremental length of sensor cable, the complex product of the incremental response of each range bin that comprises the complementary range bin defining the end-to-end correlated response in each correlated range bin (C-Bin) along the length of sensor cable thereby locating a disturbance to the nearest C-bin.

9. The fence disturbance sensor of claim 8, wherein the reflected RF signal is an amplitude modulated low frequency audio signal, the amplitude modulated low frequency audio signal corresponding to a vibration of the moving-wire transmission line, the amplitude modulated low frequency audio signal received by at least one of the first processor and the second processor and resulting in a magnitude response proportionate to the amplitude of the amplitude modulated low frequency audio signal.

10. The fence disturbance sensor of claim 9, wherein the transmitted PN sequence is comprised of a plurality of chips, each of the plurality of chips having a binary sign and comprising one cycle of the carrier frequency of the transmitted PN sequence, the binary sign of the chip determining a sign of a sinusoidal cycle, the sinusoidal cycle defining the phase of the complex end-to-end response, the phase of the complex end-to-end response proportionate to the location of the fence disturbance within at least one of the correlated range bins, the phase providing an unambiguous measure of location within at least one correlated range bin corresponding to the location of the fence disturbance.

11. The fence disturbance sensor of claim 10, wherein, when an amplitude of the end-to-end correlated response exceeds a predefined threshold level an event is created, the event signifying that a target response has been detected meeting predetermined correlation criteria, the predetermined correlation criteria being selected from the group of the same time, the same location and the same audio modulation.

12. The fence disturbance sensor of claim 11, wherein an alarm is declared when there are more than a predetermined number of events at a same location over a predetermined time interval.

13. The fence disturbance sensor of claim 12, wherein one of the at least two coupled transmission lines is a coaxial transmission line comprising an outer conductor and an inner coaxial conductor, the outer conductor separated from the inner coaxial conductor by dielectric material, the dielectric material having two circumferentially oriented longitudinal extending slots, at least one of the two circumferentially oriented longitudinal extending slots housing the moving-wire transmission line, the moving-wire transmission line comprising at least one flexible wire that is free to move radially within at least one of the two circumferentially oriented longitudinal extending slots relative to the sensor cable, the outer conductor shielding the moving-wire transmission line, wherein the coaxial transmission line and the moving-wire transmission line are electromagnetically coupled and are terminated at at least one of the first end and the second end of the cable.

14. The fence disturbance sensor of claim 13, wherein the transmitted PN sequence is transmitted along the coaxial transmission line and the reflected PN sequence response is received on the moving-wire transmission line in response to the movement of the sensor cable, wherein each of the first processor and the second processor receive responses corresponding to each of the transmitted PN sequence and the reflected PN sequence.

15. The fence disturbance sensor of claim 14, wherein response data from at least one of the first processor and the second processor is sent as a message over the coaxial transmission line to the other of the at least one first processor and the second processor.

16. The fence disturbance sensor of claim 15, wherein, if a cable fault is detected between a first end of the sensor cable and a second end of the sensor cable, at least one of the first processor and the second processor provide detection and target location up to a location of the cable fault and at least one of the first end of the sensor cable and a second end of the sensor cable.

17. The fence disturbance sensor of claim 16, wherein direct current (DC) power is provided over the coaxial transmission line, the coaxial transmission line in electrical communication with at least the first processor and the second processor.

18. The fence disturbance sensor of claim 17, wherein the sensor cable is attached to a fence.

19. A sensor cable for a fence disturbance sensor system, the sensor cable extending from a first processor to a second processor, the sensor cable linking the first processor and the second processor in electrical communication, the sensor cable having an internal, moving-wire transmission line and coaxial transmission line, wherein the first processor and the second processor are each configured to detect and to locate movement of the moving-wire transmission line, and wherein at least one of the first processor and the second processor is configured to assess in real time a measure of correlation between a movement of the moving-wire transmission line by the other of the at least one of the first processor and the second processor.

20. A fence disturbance system for detecting an intruder intending to breach a defined perimeter, the system comprising:

a fence disturbance sensor, the fence disturbance sensor comprising:

a first processor and a second processor; and a sensor cable extending from the first processor to the second processor, the sensor cable linking the first processor and the second processor in electrical communication, the sensor cable having an internal, moving-wire transmission line and coaxial transmission line, wherein the first processor and the second processor are each configured to detect and to locate movement of the moving-wire transmission line, and wherein at least one of the first processor and the second processor is configured to assess in real time a measure of correlation between a movement of moving-wire transmission line by the other of the at least one of the first processor and the second processor, and at least one fence portion component, the at least one fence portion component adapted to partially define the defined perimeter and receiving the sensor cable.

* * * * *